(12) United States Patent
Mencaglia et al.

(10) Patent No.: US 11,473,373 B2
(45) Date of Patent: Oct. 18, 2022

(54) THREADED CONNECTION FOR TUBULAR COMPONENT

(71) Applicants: VALLOUREC OIL AND GAS FRANCE, Aulnoye-Aymeries (FR); NIPPON STEEL CORPORATION, Chiyoda-ku (JP)

(72) Inventors: Xavier Mencaglia, Gommegnies (FR); Corey Dufrene, Houston, TX (US); Sadao Douchi, Chiyoda-ku (JP); Masaaki Sugino, Chiyoda-ku (JP)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 166 days.

(21) Appl. No.: 16/469,287

(22) PCT Filed: Dec. 13, 2017

(86) PCT No.: PCT/FR2017/053533
§ 371 (c)(1),
(2) Date: Jun. 13, 2019

(87) PCT Pub. No.: WO2018/109371
PCT Pub. Date: Jun. 21, 2018

(65) Prior Publication Data
US 2020/0102797 A1    Apr. 2, 2020

(30) Foreign Application Priority Data
Dec. 16, 2016    (FR) ...................... 16 62669

(51) Int. Cl.
*F16L 15/00*    (2006.01)
*E21B 17/042*    (2006.01)

(52) U.S. Cl.
CPC .......... *E21B 17/042* (2013.01); *F16L 15/001* (2013.01)

(58) Field of Classification Search
CPC ..... F16L 15/001; F16L 15/002; F16L 15/003; F16L 15/004; F16L 15/005; F16L 15/006; F16L 15/007; F16L 15/008; F16L 15/009
(Continued)

(56) References Cited

U.S. PATENT DOCUMENTS 6,347,814 B1 * 2/2002 Cerruti .................... E21B 17/08
285/332.4
2004/0155465 A1    8/2004 Noel et al.
(Continued)

FOREIGN PATENT DOCUMENTS

CN    2271609 Y    12/1997
CN    101233357 A    7/2008
(Continued)

OTHER PUBLICATIONS

International Search Report dated Mar. 27, 2018 in PCT/FR2017/053533 filed on Dec. 13, 2017.
(Continued)

*Primary Examiner* — Aaron M Dunwoody
(74) *Attorney, Agent, or Firm* — Oblon, McClelland, Maier & Neustadt, L.L.P.

(57) ABSTRACT

A threaded connection includes a first and a second tubular component made up one with the other. A male element of the first component includes, on its external peripheral surface, a male inner lip including an inner mg with a minimum thickness Epi and a male threaded zone. One inner end of the male threaded zone is at a non-zero axial distance (Li) from a male distal end. A female element of the second component includes, in succession over its internal peripheral surface, a female inner recess disposed facing the male
(Continued)

inner lip and a female threaded zone, such that in the made up position of the connection, a radial clearance subsists between the male inner ring and the female inner recess and an internal seal is formed locally between the male inner lip and the female inner recess. The connection is such that $10\% \leq \text{Epi}/\text{Li}$.

20 Claims, 4 Drawing Sheets

(58) Field of Classification Search
USPC .................................... 285/333, 334, 390
See application file for complete search history.

(56) References Cited

U.S. PATENT DOCUMENTS

| 2008/0265575 | A1 | 10/2008 | Charvet-Quemin et al. |
| 2010/0102553 | A1 | 4/2010 | Patureau et al. |
| 2012/0286507 | A1 | 11/2012 | Maillon et al. |
| 2013/0069164 | A1 | 3/2013 | Marino et al. |

FOREIGN PATENT DOCUMENTS

| CN | 203742473 U | 7/2014 |
| CN | 104114926 A | 10/2014 |
| EP | 2 589 846 A1 | 5/2013 |
| EP | 3 205 918 A1 | 8/2017 |
| FR | 2 889 727 A1 | 2/2007 |
| FR | 2 913 746 A1 | 9/2008 |
| FR | 2 952 993 A1 | 5/2011 |
| FR | 2 953 272 A1 | 6/2011 |
| WO | WO 02/073076 A1 | 9/2002 |
| WO | WO 2004/109173 A1 | 12/2004 |
| WO | WO 2008/110494 A1 | 9/2008 |
| WO | WO 2011/063976 A2 | 6/2011 |

OTHER PUBLICATIONS

Vallourec: "VAM Book", Apr. 2016, XP055388838, Retrieved from the Internet: URL: http://www.vamservices.com, 364 total pages.

* cited by examiner

THREADED CONNECTION FOR TUBULAR COMPONENT

The invention relates to the field of sealed connections for tubular components used in particular for drilling or operating hydrocarbon wells. During drilling or operating, the connections are subjected to large compressive and tensile loads and they must not come apart.

These connections are subjected to axial tensile or compressive loading, internal or external fluid pressures, to bending or twisting, possibly in combination and with an intensity that can fluctuate. The seal must be guaranteed despite the loading and despite the harsh on-site conditions of use. The threaded connections have to be able to be made up and broken out several times without degradation to their performance, in particular by galling. After breakout, the tubular components may be re-used under other service conditions.

Under tension, a phenomenon of jump-out may occur and propagate from one thread to another, running the risk of the connection coming apart. This phenomenon is facilitated by a high internal pressure.

In this regard, the application FR 2 952 993 is known, which discloses a threaded connection comprising a first and a second tubular component. The first component comprises a male end comprising a distal surface and a male threaded zone on its external peripheral surface. The second component comprises a female end comprising, a distal surface and a female threaded zone on its internal peripheral surface. The male threaded zone is made up into the female threaded zone, said threaded zones comprising threads with an increasing width from their respective distal surface, the threads comprising load flanks at negative angles over at least a portion of their radial dimension, and stabbing flanks such that in the connected state, a radial clearance subsists between the crests of the male threads and the roots of the female threads and/or between the crests of the female threads and the roots of the male threads. An axial clearance also subsists between the stabbing flanks of the male and female threads in the connected state. In a connection of this type, the distal surface of the male end and/or of the female end is brought into axial abutting contact against a corresponding abutment surface. That solution can be used to improve the tensile strength, but its structural performance in resisting high external and internal pressures results in a great deal of bending of the sealing lips. There exists a need for improvement to the seal when under load with variations between high external pressure and high internal pressures.

Furthermore, it should be noted that inserting and removing inspection or drilling accessories into and from the interior of a string formed by tubes in accordance with the invention cited above presents various difficulties when passing from one made up tube to another.

The present invention may also be used to improve the seal of a connection under bending loads compared with prior art solutions.

The invention concerns a threaded connection comprising a first and a second tubular component made up one with the other, the first component comprising a first tube and a male element disposed at one end of said first tube, the male element comprising, in succession over its external peripheral surface:
  a male distal surface
  a male inner lip comprising an inner ring with a minimum thickness $E_{pi}$,
  a male threaded zone, wherein one inner end of said male threaded zone is at a non-zero axial distance $L_i$ from the male distal surface,
  a male outer recess, and
  an external shoulder which can form a male external abutment surface,
the second component comprising a second tube and a female element disposed at one end of said second tube, the female element comprising, in succession over its internal peripheral surface:
  an internal shoulder
  a female inner recess, disposed facing the male inner lip,
  a female threaded zone,
  a female outer lip comprising an outer ring with a minimum thickness $E_{pe}$,
and
  a female distal surface which can cooperate with the male external abutment surface by an abutment action, said female distal surface being situated at a non-zero axial distance $L_e$ from one outer end of the female threaded zone, such that in the made up position of the connection, a radial clearance subsists between the male inner ring and the female inner recess, a radial clearance subsists between the female outer ring and the male outer recess, an internal seal being formed locally between the male inner lip and the female inner recess, the connection being such that:

$$10\% \leq E_{pi}/L_i$$

In particular, the ratio $E_{pi}/L_i$ is fine-tuned as a function of a nominal external diameter of the first tube, this nominal external tube diameter being measured at a distance from the male element, such that if this nominal external tube diameter is more than 200 mm, and preferably more than 250 mm, the connection is then such that:

$$25\% \leq E_{pi}/L_i$$

Similarly, the connection in accordance with the invention may be optimized as regards its external seal, for example formed locally between the female outer lip and the male outer recess, in a manner such that the connection is such that:

$$10\% \leq E_{pe}/L_e$$

Preferably, the ratio $E_{pe}/L_e$ may be selected in a manner such that it is greater than or equal to 15% and, more preferably, greater than or equal to 20%.

For a better definition of the invention, the ratio $E_{pi}/L_i$ may be a maximum of 80%, and preferably less than or equal to 60%, or in fact less than or equal to 50%.

Similarly, the ratio $E_{pe}/L_e$ may be a maximum of 80%, and preferably less than or equal to 60%, or in fact less than or equal to 50%.

In particular, the distance $L_i$ between the male threaded zone, particularly an inner machining end of said male threaded zone, and the male distal surface may be in the range 15 mm to 25 mm. The distance $L_i$ represents the axial length of the male inner lip. Similarly, the distance $L_e$ between the female distal surface and the outer machining end of the female threaded zone may be in the range 15 mm to 25 mm. The distance $L_e$ represents the axial length of the female outer lip. The axial measurements are carried out along a longitudinal axis of the tube. When the connection is made up, the longitudinal axis of the connection merges with the longitudinal axes of the first and second tubes.

Preferably, the threaded zones may comprise threads, respectively male and female, of increasing width. The threads may comprise load flanks at negative angles and stabbing flanks at a positive angle, a radial clearance subsisting in the connected state between the crests of the male threads and the roots of the female threads and/or between the crests of the female threads and the roots of the male threads, an axial clearance also subsisting between the stabbing flanks of the male and female threads in the connected state.

Preferably, the male external abutment surface may be at an angle α with respect to a perpendicular to the longitudinal axis of the connection, in a manner such as to form an acute angle between the male external abutment surface and the second male surface. In complementary manner, the female distal surface may be at the same angle α. The angle α may be in the range 5° to 45°.

Preferably, the load flanks may be at an angle in the range −1° to −15°.

Preferably, the stabbing flanks may be at an angle in the range 1° to 15°.

By convention and as is the usual practice, the angles of the flanks will be defined in the present document as negative in sign when the end of that flank, considered from the crest side of the thread, overhangs the other end of the flank at the thread root, and positive in sign in the opposite case (when there is no overhang).

Preferably, in the connected state, the male distal surface cannot come into contact with the internal shoulder of the female element.

Preferably, in the connected state, the male external abutment surface may come into abutting contact with the female distal surface.

Preferably, the internal seal may be obtained by radial interference between a male internal sealing surface with a corresponding female internal sealing surface, provided in the female inner recess of the female element. In particular, if the ratio Epi/Li is too small, the rigidity of the inner ring is too low, which can make the internal seal unstable. In accordance with the invention, the ratio Epi/Li must be more than 10%. In order to facilitate machining of the threaded portion without risking damage to the male internal sealing surface, the dimension Li may in particular be selected so as to be more than 15 mm.

Preferably, the male internal sealing surface may be cylindrical or tapered, or in fact composed of a cylindrical portion adjacent to a tapered portion. A cone half-angle of a tapered portion of the male internal sealing surface may be in the range 2° to 15°. And preferably, the female internal sealing surface may be toroidal with a radius in the range 10 to 80 mm or tapered with a cone half-angle in the range 2° to 15°. A maximum thickness perpendicular to this male internal sealing surface Esp is greater than the thickness Epi of the inner ring. A configuration of this type improves the rigidity in the interference zone between the respective male and female internal sealing surfaces.

As an example, a ratio Epi/Esp is greater than or equal to 1.05, and more preferably, greater than or equal to 1.1.

Preferably, an outer seal may be obtained by radial interference between a male external sealing surface of the male outer recess and a corresponding female external sealing surface provided on the female element in the female outer lip. In particular, if the ratio Epe/Le is too low, the rigidity of the outer ring is too low, which can make this outer seal unstable. In accordance with the invention, the ratio Epe/Le must be more than 10%/a. In order to facilitate machining of the female threaded portion without risking damage to the female external sealing surface, the dimension Le may in particular be selected so as to be more than 15 mm.

Preferably, the male external sealing surface may be toroidal with a radius in the range 10 to 150 mm or tapered with a cone half-angle in the range 2° to 15°.

Preferably, the female external sealing surface may be toroidal or tapered, the cone half-angle being in the range 2° to 15°, and such that a maximum thickness perpendicular to said female external sealing surface Esb is greater than the thickness Epe of the outer ring.

As an example, a ratio Epe/Esb is greater than or equal to 1.05, and more preferably, greater than or equal to 1.1.

A configuration of this type improves the rigidity in the zone where there is interference between the respective male and female external sealing surfaces.

The ratios Epe/Le and Epi/Li in accordance with the invention are optimized in order to guarantee the stability of the sealing performances.

Preferably, at its internal perimeter, the male element may have a chamfer linking to the male distal end. The chamfer may be at an angle β with respect to a plane orthogonal to the longitudinal axis of the connection in order to facilitate insertion or removal of inspection or drilling accessories. Preferably, the angle β may be in the range 20° to 30°.

Preferably, the maximum external diameter of the female element may be in the range 100% to 103% («semi-flush»), and more preferably in the range 100.2% to 101% («flush») of the nominal external diameter of the second tube.

Preferably, the minimum internal diameter of the male element may be smaller than a nominal internal diameter of the first tube.

Other characteristics and advantages of the invention will become apparent from an examination of the detailed description below and the accompanying drawings, in which:

FIG. 1 is a theoretical illustration of an overall view of a connected first threaded connection in a longitudinal sectional view, FIG. 2 is a theoretical illustration of the threaded connection in accordance with the invention of FIG. 1 in an enlarged detailed view A, FIG. 3 is a theoretical illustration of the threaded connection in accordance with the invention of FIG. 1 in an enlarged detailed view B.

The theoretical illustrations of FIGS. 1 to 3 illustrate the zones of the male and female elements of a connection in accordance with the invention in a configuration wherein the interference is not shown. In these theoretical illustrations, the portions intended to come into interfering contact overlap locally. In the case in point, these interfering portions are the internal and external sealing surfaces. In the overlapping zone, a different type of cross-hatching is used. This cross-hatching means that the intended difference in diameter between the elements can be identified. In the cross-hatched zone, the external diameter of the male element portion is greater than the internal diameter of the corresponding portion of the female element. A radial thickness of this cross-hatching represents the value for the radial interference, which can be measured in millimetres, perpendicular to the sealing surfaces. In these theoretical views, the threaded zones are not shown in detail.

FIGS. 1 to 3 provide a better diagrammatic understanding of the radial height of interpenetration intended in the design of the male and female elements intended to form the connection in accordance with the invention.

Clearly, in reality, the material of the male and female elements does not interpenetrate, but creates a local zone of tight contact termed a metal-metal seal.

Bearing this in mind, FIG. 4 is a diagrammatic illustration of a connection in accordance with the invention in the final position of makeup of the connection, with grey shading to indicate the results of finite elemental analysis of the loads observed in a connection in accordance with the invention in the final makeup position. The darkest zones are those in which the loads are the greatest.

The accompanying drawings not only serve to complete the invention, but also contribute to its definition if necessary. As is the case with all of the drawings in the application, the representations illustrate half planes, because they are symmetrical with respect to the axis of the tube and the connection.

In order to improve the connections, the Applicant has developed superior connections known as premium connections which go above and beyond API standards. Some sealing surfaces may be provided in the vicinity of the threaded zones, said surfaces being brought into clamping contact during makeup of the components. In particular, these surfaces are assumed to be selected in order to exhibit radial interference.

The seal to fluids (liquids and gas) under high pressure thus results from contact in accordance with mutual radial clamping of the sealing surfaces. The intensity of the radial clamping is a function of the relative axial positioning of the male and female threaded zones, said relative positioning possibly being determined by bringing the abutment surfaces provided respectively on the male and female elements into abutting contact.

Preferably, only the male and female external abutments come into contact in a connection in accordance with the invention.

Sealing surfaces can be used to prevent the movement of fluid (liquids and gas, at ambient pressure and atmospheric pressure) between the interior and exterior of the connection in accordance with the invention.

Figure 1:
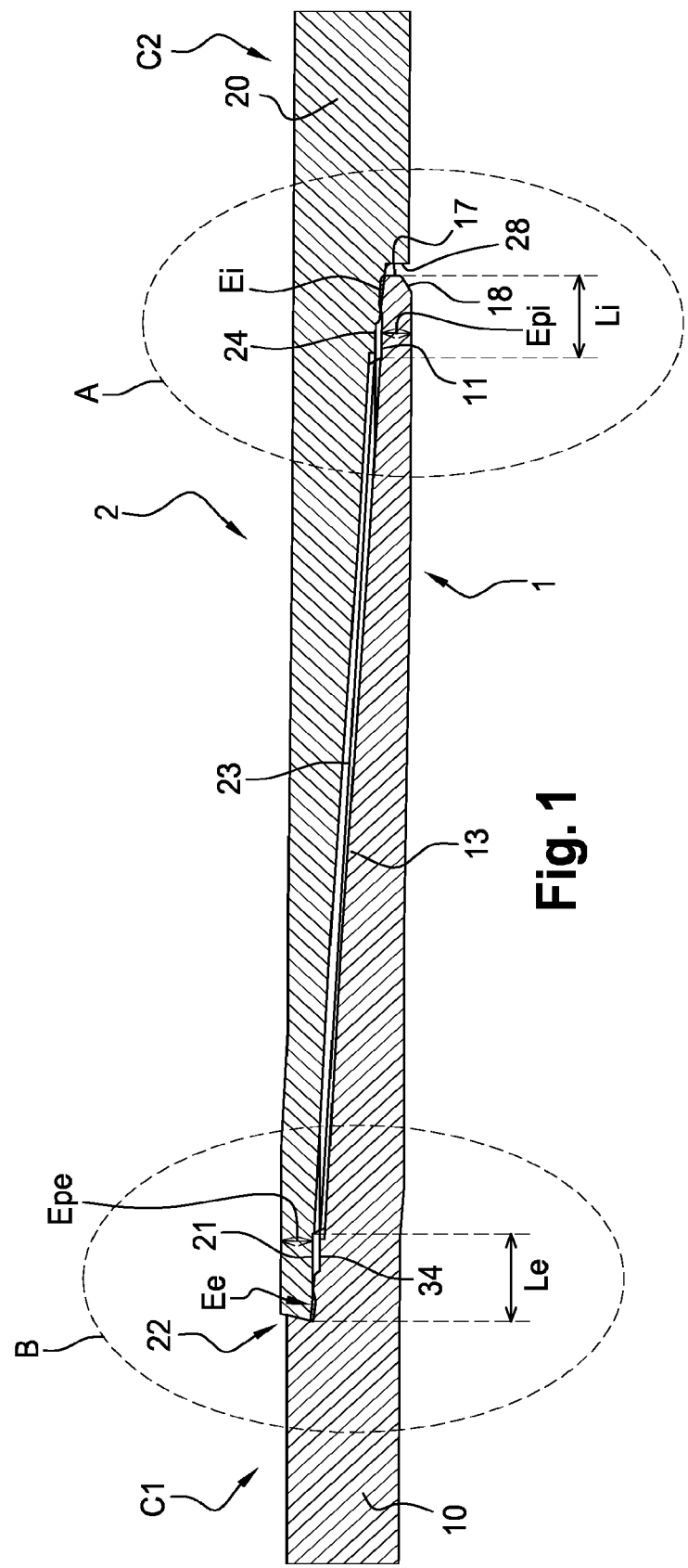

FIG. 1 represents a connection in accordance with the invention formed by makeup of a tubular component C1 having a male threaded element 1 with a tubular component C2 provided with a female threaded element 2. The connection comprises an internal seal Ei and an outer seal Ee.

The tubular components C1 and C2 each comprise a tube, respectively 10 and 20. The female element and the male element intended to form the connection in accordance with the invention are disposed at the ends of such tubes. The male threaded element 1 is disposed at one end of the first tube 10. The female threaded element 2 is disposed at one end of the second tube 20. The tubes 10 and 20 may be several metres in length, for example of the order of 10 to 15 metres in length. A great length tube may be provided with a male threaded element at one end and with a female threaded element at an opposite end. However, the invention may nevertheless also be applied to a connection employing a coupling comprising a short tube provided with female threaded elements at both of its ends.

The connection in accordance with the invention may be used to constitute casing strings or tubing strings for hydrocarbon wells, work-over risers or drill pipe strings for the same wells.

The tubes are preferably formed from steel. In fact, they may be produced from different grades of non-alloyed, low alloy or high alloy steel, or even from ferrous or non-ferrous alloy, heat treated or work hardened depending on the service conditions such as, for example: level of mechanical load, corrosive nature of the fluid inside or outside the tubes, etc. It is also possible to use steel tubes that have low corrosion resistance covered with a protective coating, for example a coating of a corrosion-resistant alloy or a synthetic material.

In FIG. 1, the female threaded element 2 comprises a female threaded zone 23. The female threaded zone 23 is tapered, for example with a cone half-angle in the range 0.5° to 3°, preferably in the range 1° to 3°. The female threaded zone 23 is disposed on the interior of the female element 2. The male threaded element 1 comprises a male threaded zone 13 disposed on the exterior surface of said male end 1. The male threaded zone 13 is engaged with the female threading 23. The male threaded zone 13 has a taper which is substantially equal to that of the female threaded zone 23.

Male Threaded Element 1

The male threaded zone 13 is extended by an inner male lip in the direction of a free distal end 17. The external surface of the inner male lip is defined on one side by an inner end of the male threaded zone 13, and on the other side by the free distal end 17. The free distal end 17 extends substantially radially relative to the longitudinal axis of the component C1.

Figure 2:
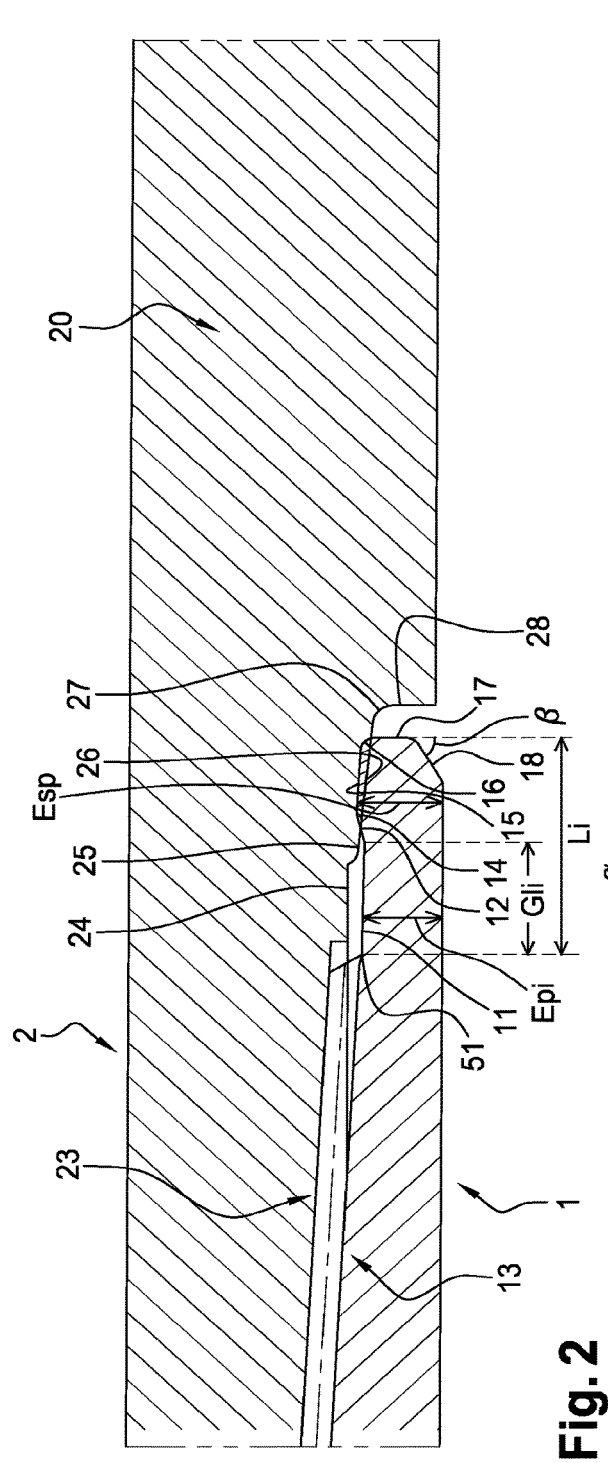
Figure 5:
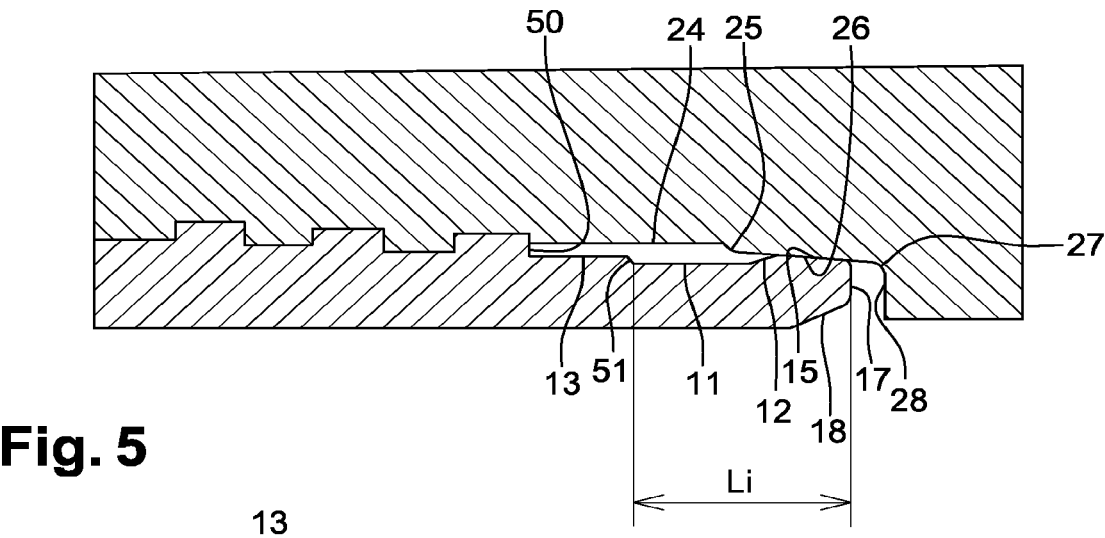
FIG. 5 is a diagrammatic illustration of the detail A1 of FIG. 5 in the final made up position of the connection.

In FIGS. 2 and 5, the inner male lip thus comprises, in succession after the male threaded zone 13 in the direction of the free distal end 17:

a first surface 11 adjacent to the male threaded zone 13
a first male terminal portion, adjacent to this first surface 11, and itself comprising, in succession:
a first tapered surface 12 with a diameter that increases towards the free distal end 17 with a cone half-angle in the range 5° to 30°,
a fillet 14 for which the convex radius is in the range 0.4 to 1.4 mm.
a male internal sealing surface 15, and
a second fillet 16 for which the convex radius is in the range 0.4 to 1 mm, this second fillet 16 being adjacent to the free distal end 17.

Figure 7:
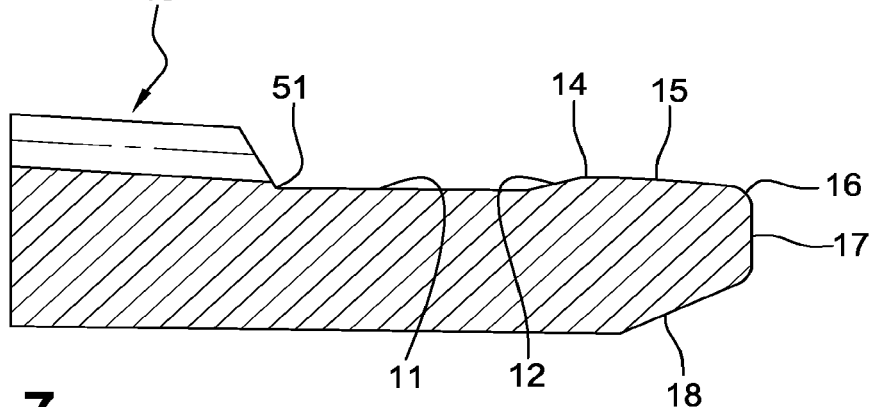
FIG. 7 illustrates a first embodiment of a male element of a connection in accordance with the invention, in the vicinity of its male distal end.

In FIGS. 5 and 7, the male internal sealing surface 15 is tapered with a diameter that decreases towards the male free end. In particular, for a tapered sealing surface, the half-angle is in the range 2° to 15°, more preferably in the range 4° to 8°. Alternatively, this male internal sealing surface 15 may be cylindrical, or in fact toroidal for which the convex radius is in the range 10 to 80 mm.

Figure 8:
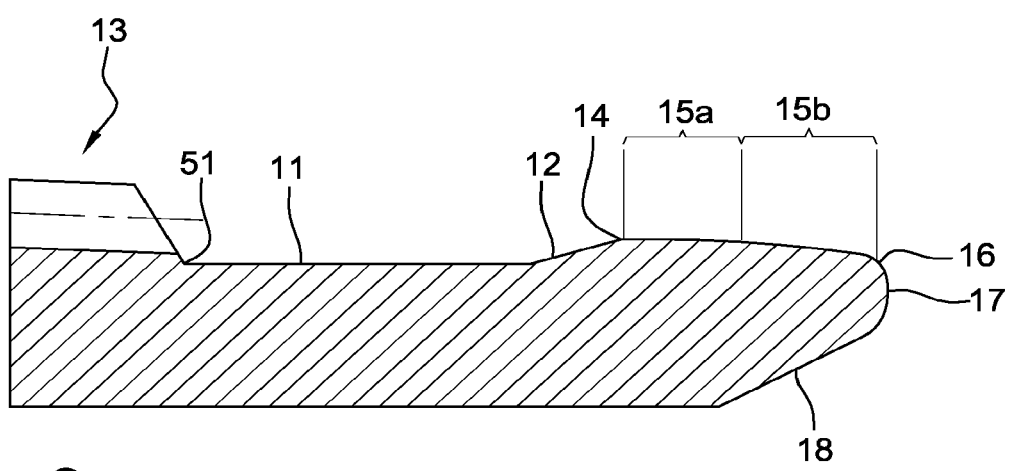
FIG. 8 illustrates a second embodiment of a male element of a connection in accordance with the invention, in the vicinity of its male distal end.

In a variation, the male internal sealing surface 15 may be complex, as can be seen in FIG. 8. A complex male internal sealing surface 15 is composed of a cylindrical portion 15a, connected to the first fillet 14, and a tapered portion 15b with a diameter that decreases towards the male free end 17, up to a second fillet 16. The respective cylindrical 15a and tapered 15b portions are adjacent. The half-angle of the tapered portion 15b is in the range 2° to 15°, more preferably in the range 7.5° to 10°. As an example, for tubular components for which the tube has a nominal external diameter of less than 355.6 mm (14 inches), the male sealing surface 15 is complex.

The male inner lip has a length Li measured axially, this length Li being the smallest distance, measured along the longitudinal axis of the components C1 and C2, between the male threaded zone 13 and an apex of the male free distal surface 17. Machining the helix intended to form the male threaded zone 13 commences from a run-in 51 represented in FIGS. 2, 5, 7 and 8. The run-in 51 delimits the male threaded zone 13 of the first surface 11. The run-in 51 located to the side of the distal surface 17 constitutes the inner end of the male threaded zone 13. The length of the lip Li is measured between this run-in 51 and the apex of the distal surface 17.

The first surface 11 defines an inner ring. This inner ring may be a cylinder. In the example shown, the first surface 11 comprises a generatrix parallel to the axis of the components C1 and C2, which is also parallel to the longitudinal axis of the connection.

A wall thickness Epi of the inner ring perpendicular to this first surface 11 is thus constant along the whole of the first surface 11, which means that said first surface 11 can be defined.

The constant thickness portion Epi axially represents a distance Gli which can cover at least a third, and more preferably at least 45% of the length Li.

Alternatively, when the inner ring is not a cylinder, the parameter Epi considered in accordance with the invention is the minimum wall thickness observed between the threaded portion 13 and the male internal sealing surface 15.

In particular, the thickness Epi is less than the radial thickness Esp observed perpendicular to the male internal sealing surface 15.

Optionally, a chamfer 18 is at an angle β with respect to the male free distal surface 17. The angle β is in the range 20° to 30°. Thus, the chamfer 18 has a tapered shape with a diameter that increases towards the free distal end 17, i.e. towards the male abutment surface. The chamfer 18 can be used for inserting inspection accessories or even drilling accessories with diameters which are smaller than but close to those of the tubes in accordance with the invention into the string obtained by connecting several tubes by makeup. This insertion is therefore facilitated and snagging at the level of the connection is avoided. Removal of the accessory is also facilitated.

This configuration with a difference in diameter and a chamfer means that inspection or drilling accessories can be inserted into the interior itself of the tube without risking snagging one end of the tube due to extra thicknesses, also known as protrusions, used to improve the bending resistance.

Figure 3:
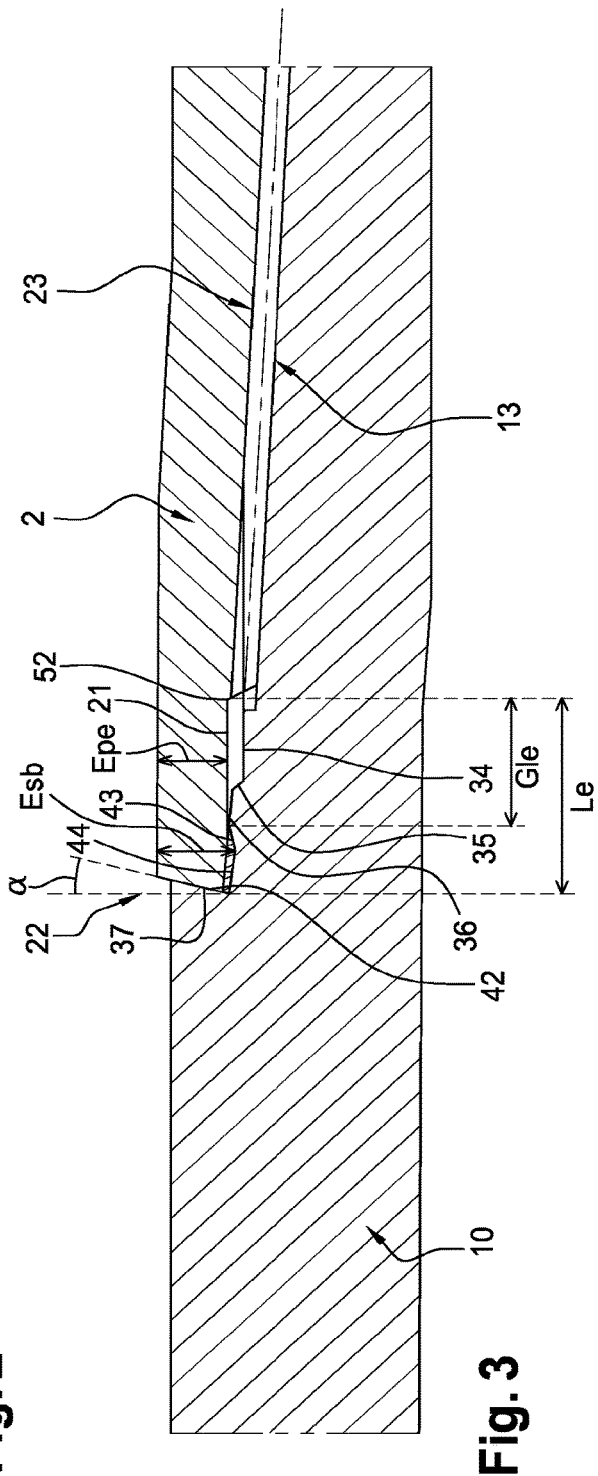
Figure 4:
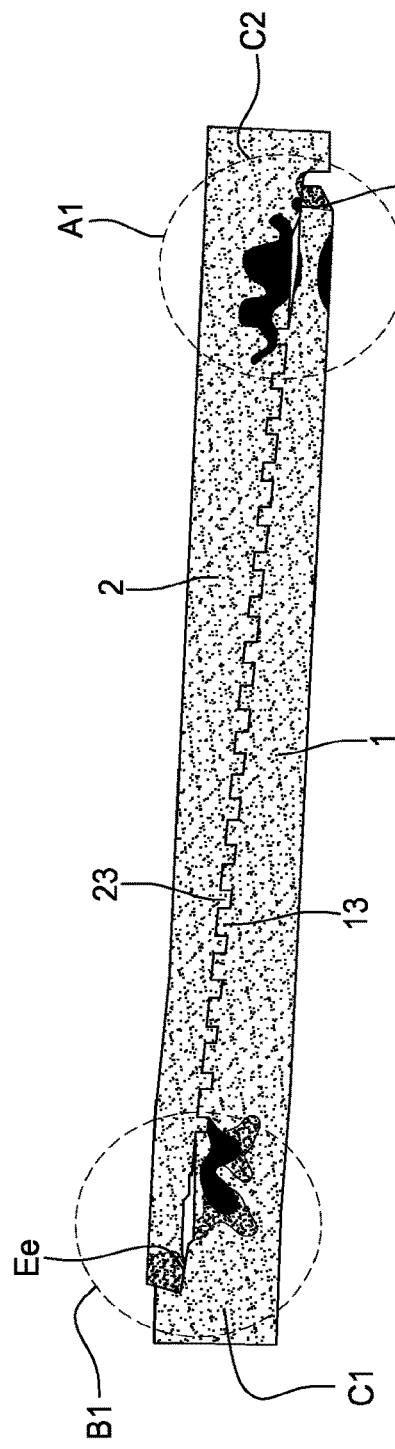
Figure 6:
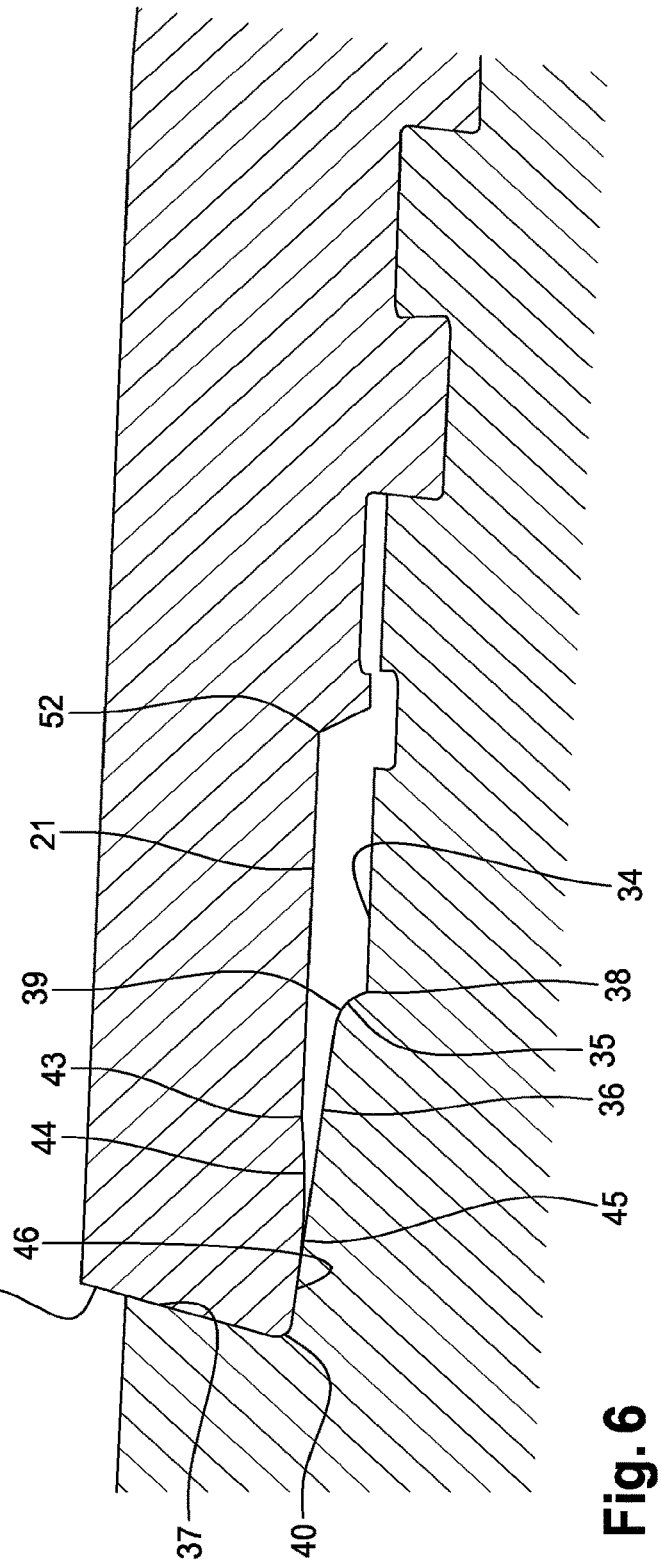
FIG. 6 is a diagrammatic illustration of the detail B1 of FIG. 5, in the final makeup position of the connection.

Furthermore, this male threaded element 1 comprises a male outer recess as illustrated in FIGS. 3 and 6 on its external periphery in an extension of the male threaded zone 13 in the direction of the body of the tube 10. The male outer recess comprises a second surface 34, this second surface 34 possibly being immediately adjacent to the male threaded zone 13.

Said second surface 34 is itself extended, still in the direction of the body of the tube 10, by a second outer terminal portion. Said second outer terminal portion, as illustrated in FIGS. 3 and 6, comprises in succession:
- a first fillet 38 between the second surface 34 and a second tapered surface 35, this fillet 38 being capable of forming a concave radius portion
- the tapered surface 35 having a diameter that increases in the direction of the body of the tube 10, with a cone half-angle in the range 5° to 45°,
- a second fillet 39 for which the convex radius is in the range 1 mm to 8 mm; this radius can be dispensed with if the tools can be removed without it.
- a toroidal male external sealing surface 36 with a radius in the range 10 to 150 mm, or tapered with a diameter that increases towards an external abutment 22 with a cone half-angle in the range 2° to 15°,
- a final fillet 40 with a concave radius, being adjacent to an external abutment surface 37.

The external abutment surface 37 has a positive angle α with respect to the perpendicular to the longitudinal axis of the connection. The positive angle is orientated in the trigonometric sense, i.e. in the clockwise direction. The positive angle α is in the range 5° to 45°. The final fillet 40 is on an angular arc, so that an acute angle may be formed between the male external sealing surface 36 and the male external abutment surface 37.

Female Threaded Element 2

The female threaded element 2 comprises, on its internal periphery, a threaded zone 23 intended to allow makeup with the corresponding male threaded element 13, with a configuration either side of the threaded zone 23 which we shall now describe in the paragraphs below.

In FIG. 2, the female threaded element comprises a female inner recess facing the male inner lip. This female inner recess comprises, in succession in the direction from the female threaded zone 23 towards an internal shoulder 28:
- a first female surface 24
- a first female terminal portion comprising, in succession:
- a fillet 25 to the first surface 24, this fillet 25 having a convex radius in the range 0.8 mm and 10 mm.
- a toroidal female internal sealing surface 26 with a radius in the range 10 to 80 mm or a taper with a diameter that decreases towards the internal abutment 28 with a cone half-angle in the range 2° to 15°. This sealing surface 26 is capable of coming into interfering contact with the corresponding male internal sealing surface 15. The female internal sealing surface 26 may have the same taper as that of the male internal sealing surface 15.
- a fillet 27 the concave radius of which is in the range 0.4 mm to 2 mm, this fillet 27 connecting the female internal sealing surface 26 to the internal shoulder 28.

In a preferred embodiment of the invention, the female internal sealing surface 26 is tapered.

The internal shoulder 28 is preferably orientated radially with respect to the longitudinal axis of the connection.

However, in the connected state, in the embodiment shown in FIGS. 1 and 2, there is an axial clearance between the internal shoulder 28 and the free male distal surface 17. The two surfaces 17 and 28 thus do not come into contact in the connected state. This has the effect of preventing abutting contact at the inner lip, which would have the consequence of increasing bending of the lip by adding compressive loads to the surfaces 17 and 28 when the connection is under compression. Finally, in the connected state, it will be noted that there is a radial clearance between the first surfaces 11 and 24 in order to create a relief to allow grease trapped in the threading to be collected.

The fillet 25 may be dispensed with if the machining tools can be removed without it. Dispensing with the fillet 25 further improves the makeup performances.

The female end as illustrated in FIG. 3 further comprises an outer female lip on its internal periphery in the extension of the threaded zone 23 in the direction of its free end 42.

Said outer female lip includes a second surface 21 and a second terminal portion in the extension of the second female surface 21 in the direction of the external abutment 42. This second terminal female portion comprises, in succession:
- a convex toroidal surface 43 with a radius in the range 5 mm and 40 mm.
- a tapered portion 44 with a diameter that decreases towards the female free end, connected via a point of inflexion 45 to
- a female external sealing surface 46, which is convexly toroidal or tapered with a diameter that decreases towards the female free end. In the example shown, the female external sealing surface 44 is tapered with a cone half-angle in the range 2° to 15°. This sealing surface 46 is capable of coming into interfering contact with the corresponding male external sealing surface 36.
- the abutment surface 42 is at a positive angle α with respect to the perpendicular to the longitudinal axis of the connection. The positive angle is orientated in the trigonometric sense, i.e. in the clockwise direction. The positive angle α is in the range 5° to 45°. This abutment surface is capable of coming into contact with the corresponding external abutment surface male 37. This positive angle can be used to brace the abutment of the female abutment surface 42 against the male abutment surface in order to increase the contact pressures.

The female outer lip has a length Le measured axially along the longitudinal axis of the components C1 and C2, this length Le being the smallest distance between the female threaded zone 23 and an apex of the distal end of the abutment surface 42. Machining the helix intended to form the female threaded zone 23 commences from a run-in 52 represented in FIGS. 1, 3 and 6. The run-in 52 delimits the female threaded zone 23 of the second female surface 21. The run-in 52 located to the side of the distal abutment surface 42 constitutes the outer end of the female threaded zone 23. The length of the lip Li is measured between this run-in 52 and the apex of the female distal abutment surface 42.

The second surface 21 defines an outer ring. This outer ring may be a cylinder. In the example shown, the second surface 21 comprises a generatrix parallel to the axis of the components C1 and C2 which is also parallel to the longitudinal axis of the connection.

A thickness Epe of the outer ring perpendicular to this second surface 21 is constant along the whole of the second surface 21, which means that this second surface 21 can be defined.

The portion with a constant thickness Epe axially represents a distance Gle which can cover at least a third and more preferably at least 45% of the length Le.

Alternatively, when the outer ring is not a cylinder, the thickness Epe in accordance with the invention represents the minimum thickness observed between the female threaded portion 23 and the external female sealing surface 44.

In particular, the thickness Epe is less than the radial thickness Esb observed perpendicular to the external female sealing surface 44.

In the connected state as illustrated in FIGS. 1 and 3, there may be an interfering contact, i.e. with interpenetration of material, at the outer abutment 22. In addition, the fillet surfaces 36 and 43 may also come into interfering contact in the radial sense, thereby creating a better seal.

Finally, in the connected state, there is a radial clearance between the second surfaces 21 and 34 in order to create a relief that can collect grease trapped in the threading.

The fillets are optional.

EXAMPLES

The Applicant is concerned with large diameter threaded connections, in particular those of more than 127 mm, but less than 460 mm, preferably less than 406.4 mm i.e. 16 inches. Connections of this type are occasionally subjected to large internal and external pressures in addition to tensile/compressive forces. These pressure levels have a tendency to induce large plastic deformations with bending of the inner and outer lips, thereby degrading the sealing properties of these connections. The tensile strength has also been taken into consideration in the connection in accordance with the invention.

In fact, when the tensile load is excessive, the threads can become separated from each other by a jump-out phenomenon which causes the two components of the connection to separate. The consequences may be particularly unfortunate from a technical viewpoint and from a cost viewpoint. This is particularly the case when the threading has a tapered generatrix, because jump out of one thread may cause the entire connection to come apart.

Thus, the connection in accordance with the invention reduces the risk of jump out of the thread independently of the position of the thread, with a low makeup torque, allowing the sealing surfaces to be positioned correctly and with sufficient gaps for grease. These gaps are obtained by the surfaces either side of the threading.

Preferably, in the connection in accordance with the invention, the internal seal is of the "cone on cone" type and the outer seal is of the "cone on cone" type.

"Cone on cone" contact is stable between the sealing surfaces during combined loading, and this is a good configuration for improving the performances during makeup. "Cone on cone" seals limit the risk of galling during makeup.

A "torus on cone" seal may also be used. It can be used to compensate for the effect of bending of the inner lip under internal pressure loads. The sealing surface of the male threaded element turns slightly, but the radius which constitutes the internal sealing surface male 15 is large, and so the contact still operates in a torus on cone configuration by being displaced slightly along the complementary female sealing surface.

The maximum external diameter of the female end is greater than the maximum external diameter of the male end. As regards the internal diameters, the internal diameter of the female end is greater than the maximum internal diameter of the male end.

In particular, the Applicants have observed the following results:

| Nominal external diameter (mm) | 298.45 | 355.60 | 355.60 | 346.08 |
|---|---|---|---|---|
| Tube thickness (mm) | 12.42 | 20.62 | 20.62 | 15.88 |
| Epi min-max (mm) | 3.6-4.1 | 5.1-5.5 | 5.1-5.5 | 4.3-4.7 |
| Gli Inner ring length (mm) | 7.57 | 8.33 | 8.25 | 8.42 |
| Li min-max (mm) | 15-16 | 16-17 | 16-17 | 16-17 |
| Epe min-max (mm) | 3.6-3.9 | 5.5-5.8 | 5.5-5.8 | 4.9-5.2 |
| Gle Outer ring length (mm) | 8.76 | 10.00 | 10.01 | 8.88 |

-continued

| | | | | |
|---|---|---|---|---|
| Le min-max (mm) | 17-18 | 17-18 | 17-18 | 19-20 |
| Epi/Li | 24.7% | 33% | 33% | 28% |
| Epe/Le | 22% | 33% | 33% | 26% |
| Qualification obtained | Did not qualify Leaked under internal pressure | Qualified API RP 5C5 2015 CAL II | Qualified API RP 5C5 2015 CAL II | Qualified API RP 5C5 2015 CAL II |

In particular, the Applicants have optimized the Epi/Li ratio for external diameters of the tube at their nominal section of more than 200 mm, or even of more than 250 mm, and they have selected a Epi/Li ratio greater than or equal to 25% for this type of configuration.

Optimization may be carried out by combining the parameters for external diameters of more than 200 mm with those for tube wall thicknesses (at a distance from the connection) in the range 10 to 25 mm, and selecting a Epi/Li ratio of greater than or equal to 25% for this type of configuration.

Optimization may also be carried out by combining three parameters, namely the external diameter parameter of more than 200 mm with the tube wall thickness parameter (at a distance from the connection) in the range 10 to 25 mm, and the parameter for a flush type connection, and selecting a Epi/Li ratio of greater than or equal to 25% for this type of configuration.

In particular, the inner male lip must satisfy the following equation:

$$100/\% \leq Epi \text{ (mm)}/Li \text{ (mm)} \leq 80\%.$$

Advantageously, the outer female lip must satisfy the following equation:

$$10\% \leq Epe \text{ (mm)}/Le \text{ (mm)} \leq 80\%.$$

The invention also consists of dimensioning the internal and external lips in a manner such that these lips can resist the internal and external pressure to which the connection is subjected.

The female threaded zone 23 comprises threads with an axial length in the vicinity of the crest greater than the axial length in the vicinity of the base. The male threaded zone 13 comprises threads with an axial length in the vicinity of the crest that is greater than the axial length in the vicinity of the base. The angle of inclination of a stabbing flank of a threading in accordance with the invention is positive, the angle being measured with respect to a radial plane perpendicular to the axis of the connection. The angle of inclination of a load flank of a thread in accordance with the invention is negative, the angle being measured with respect to a radial plane perpendicular to the axis of the connection. In a preferred embodiment, the threads have a dovetail profile. Alternatively, the angle of inclination of a load flank differs from the angle of inclination of a stabbing flank. In another alternative, the angle of inclination of a stabbing flank of the female threaded zone 23 is equal to the angle of inclination of a stabbing flank of the male threaded zone 13. The angle of inclination of a load flank of the female threaded zone 23 is substantially equal to the angle of inclination of a load flank of the male threaded zone 13.

A threading in accordance with the invention comprises a crest, a root, a load flank and a stabbing flank. Fillet radii are provided between the flanks and crest and between the flanks and root. The width of the crests and roots vary as a function of the position of the corresponding thread along the axis of the tube. Said width L can be expressed in the form: $L = L_0 + A x$, with $L_0$ and $A$ being constants and $x$ the position along the axis. The width is measured parallel to the axis of the connection in accordance with the invention. The diameter of the crests and roots varies as a function of the position of the corresponding thread along the axis of the tube due to the taper of the threading. The thread crests and roots are parallel to the axis of the threaded connection. This facilitates machining and engagement during makeup.

The male threaded zone 13 may have a first portion in which the width of the teeth increases from a value corresponding to the width of the tooth closest to a terminal portion of the male end to a value corresponding to the width of the tooth furthest from said terminal portion, while the width of the teeth of the female threaded zone 23 decreases from a value corresponding to the width of the tooth furthest from a terminal portion of the female end to a value corresponding to the width of the tooth closest to said terminal portion, in a manner such that the threaded zones 13, 23 cooperate during makeup leaving an axial clearance between the stabbing flanks.

The ratio between the width of the tooth closest to a terminal portion of the male end and the width of the tooth furthest from the terminal surface of the female end may be in the range 0.1 to 0.8 as an absolute value.

The threading in accordance with the invention has a variable thread width. An axial clearance between the stabbing flanks is present in the connected state at the end of makeup, and also a radial clearance is present between the thread roots and crests in the connected state.

The load flanks of the threads are at a negative angle in the trigonometric sense, which is the sense used for all of the angles of the present description of the invention. The stabbing flanks of the threads are at a positive angle. An external abutment allows the sealing surfaces to be positioned properly.

The threading has a tooth width that increases along the threading. In fact, the male thread roots have a width that increases towards the interior of the tube, while the male thread crests run in the reverse direction, and vice versa for the female threading.

In the connected state (after makeup), a radial clearance is present between the threading crests of the male threaded zone 13 and the threading roots of the female threaded zone 23. The radial clearance is of the order of 0.05 mm to 0.5 mm. The choice of radial clearance in the connected state may be guided by the desired volume of grease and the machining tolerances. A clearance of 0.15 mm or less is desirable when machining is of high quality.

In the connected state (after makeup), an axial clearance is present between the stabbing flanks of the threads of the male and female threaded zone respectively. The axial clearance is of the order of 0.002 mm to 1 mm. The choice of axial clearance in the connected state may be guided by the desired volume of grease, the angle of the flanks and the machining tolerances. A clearance of 0.05 mm or less is desirable when machining is properly controlled and the flank angle is 5° or less as an absolute value. The load flanks take up the clamping forces in the connected state.

The load flank of the threads of the female threaded zone 23 is inclined with respect to a radial plane in a manner such as to interfere with the corresponding inclined load flank of the threads of the male threaded zone 13 in order to improve the strength in the case of elastic deformation of the connection, in particular under tensile load, with or without internal pressure. At this position, the interference is radial in order to preserve the linkage between the threadings. The threadings mutually form radial retaining hooks. The inclination of the male load flank, like the female flank, is in the range −1° to −15°. Above −1°, the radial retaining effect becomes weak. Below −15°, the compressive strength may be affected. A preferred range extends from −30 to −5°. A difference in the inclination of the male and female load flanks may be tolerated to plus or minus 3°.

The stabbing flank of the threads of the female threaded zone 23 is inclined with respect to a radial plane in a manner such as to interfere with the corresponding inclined stabbing flank of the threads of the male threaded zone 13 in order to improve the strength in the case of elastic deformation of the connection, in particular under tensile load, with or without internal pressure. The interference is radial in order to preserve the linkage between the threadings. The threadings mutually form radial retaining hooks. The inclination of the male load flank, like the female flank, is in the range 1° to 15°. Below 1°, the radial retaining effect becomes weak. Above 15°, the compressive strength may be affected. A preferred range extends from 3° to 5°. A difference in the inclination of the male and female load flanks may be tolerated to plus or minus 3°.

The inclination of the male and female stabbing flank may be equal to or different from the inclination of the male and female load flank, for example to within plus or minus 3°.

The fillet radii may be in the range 0.005 to 3 mm. The rounded fillet radii reduce stress concentrations at the feet of the load flanks and thus improve the fatigue behaviour of the connection in accordance with the invention.

The female 23 and male 13 threaded zones are multi-start, preferably double-start. Makeup can then be speeded up.

The flanks preferably have a dovetail profile. The geometry of dovetail threads increases the radial rigidity thereof when assembled compared with threads for which the axial width decreases regularly from the base to the crest of the threads.

The flanks may have a trapezoidal profile. The axial clearance between the stabbing flanks may be in the range 0.002 to 1 mm, preferably in the range 0.05 to 0.5 mm.

The radial clearance may be provided at the thread roots of the first component and/or at the thread crests of the first component. The radial clearance may be in the range 0.05 to 0.5 mm, preferably in the range 0.05 to 0.15 mm.

The load flanks may be at an angle in the range −1° to −15°, preferably in the range −3° to −5°. The stabbing flanks may be at an angle in the range 1° to 15°, preferably in the range 3° to 5°. The load flanks may be at a different angle from the stabbing flanks.

The invention is not limited to the examples of the connections and tubes described above, given solely by way of example, but it encompasses all variations that the person skilled in the art could envisage within the framework of the claims below.

The invention claimed is:

1. A threaded connection comprising:
   a first and a second tubular component made up one with the other, the first component including:
   a first tube and a male element disposed at one end of said first tube, the male element including, in succession over an external peripheral surface of the male element:
   a male distal surface,
   a male inner lip including an inner ring with a minimum thickness Epi,
   a male threaded zone, wherein one inner end of said male threaded zone is at a non-zero axial distance (Li) from the male distal surface,
   a male outer recess, and
   an external shoulder which can form a male external abutment surface,
   the second component including a second tube and a female element disposed at one end of said second tube, the female element including, in succession over an internal peripheral surface of the female element:
   an internal shoulder,
   a female inner recess, disposed facing the male inner lip,
   a female threaded zone,
   a female outer lip including an outer ring with a minimum thickness Epe, and
   a female distal surface which can cooperate with the male external abutment surface by an abutment action, said female distal surface being situated at a non-zero axial distance (Le) from one outer end of the female threaded zone,
   such that in a made up position of the connection, a radial clearance subsists between the male inner ring and the female inner recess, a radial clearance subsists between the female outer ring and the male outer recess, an internal seal being formed locally between the male inner lip and the female inner recess, the connection being such that:

$10\% \leq Epi/Li$, wherein that one of the first or the second components has a nominal external tube diameter at a distance from their respective male and/or female elements such that this nominal tube diameter is more than 200 mm, the connection then being such that:

$25\% \leq Epi/Li$.

2. The threaded connection as claimed in claim 1, wherein that the connection is such that:

$10\% \leq Epe/Le$.

3. The threaded connection as claimed in claim 1, wherein that the connection is such that:

$15\% \leq Epe/Le$.

4. The threaded connection as claimed in claim 1, wherein that the connection is such that:

$80\% \geq Epi/Li$.

5. The threaded connection as claimed in claim 1, wherein that the connection is such that:

$80\% \geq Epe/Le$.

6. The threaded connection as claimed in claim 1, wherein that the connection is such that:
   15 mm ≤ Li ≤ 25 mm.

7. The threaded connection as claimed in claim 1, wherein that the connection is such that:
   15 mm ≤ Le ≤ 25 mm.

8. The threaded connection as claimed in claim 1, wherein that the threaded zones comprise respective male and female threads of increasing width, the threads including load flanks at negative angles and stabbing flanks at a positive angle, a radial clearance subsisting, in a connected state, between crests of the male threads and roots of the female threads and/or between crests of the female threads and roots of the male threads, an axial clearance also subsisting between the stabbing flanks of the male and female threads in the connected state.

9. The threaded connection as claimed in claim 1, wherein that the male external abutment surface is at a positive angle α with respect to a perpendicular to a longitudinal axis of the connection, and in that the female external abutment surface is at the same angle α, the angle α being in the range 5° to 45°.

10. The threaded connection as claimed in claim 1, wherein that in a connected state, the internal abutment surface of the male end does not come into contact with the internal abutment surface of the female end.

11. The threaded connection as claimed in claim 1, wherein that in a connected state, the external abutment surface of the male end comes into abutting contact with the external abutment surface of the female end.

12. The threaded connection as claimed in claim 1, wherein that the internal seal comprises a male internal sealing surface which is capable of coming into interfering contact with a corresponding female internal sealing surface provided on the female element.

13. The threaded connection as claimed in claim 12, wherein the female internal sealing surface is cylindrical and/or tapered, with a cone half-angle being in the range 2° to 15°.

14. The threaded connection as claimed in claim 12, wherein the male internal sealing surface is toroidal with a radius in the range 10 to 80 mm or tapered with a cone half-angle in the range 2° to 15°, and such that a maximum thickness perpendicular to said male internal sealing surface is greater than the thickness of the inner ring.

15. The threaded connection as claimed in claim 12, further comprising an outer seal obtained by interference between a male external sealing surface and a corresponding female external sealing surface provided on the female element.

16. The threaded connection as claimed in claim 15, wherein the male external sealing surface is toroidal with a radius in the range 10 to 150 mm, or tapered with a cone half-angle in the range 2° to 15°.

17. The threaded connection as claimed in claim 15, wherein the female external sealing surface is toroidal or tapered, the cone half-angle being in the range 2° to 15°, and such that a maximum thickness perpendicular to said female external sealing surface is greater than the thickness of the outer ring.

18. The threaded connection as claimed in claim 15, wherein a lower portion of the internal abutment has a chamfer at a negative angle β with respect to a longitudinal axis of the connection in order to facilitate insertion or removal of inspection or drilling accessories.

19. The threaded connection as claimed in claim 18, wherein the negative angle β is in the range −20° to −30°.

20. The threaded connection as claimed in claim 18, wherein the maximum external diameter of the female element is in the range 100.2% to 101% of the nominal external diameter of the second tube.

* * * * *

UNITED STATES PATENT AND TRADEMARK OFFICE
CERTIFICATE OF CORRECTION

PATENT NO. : 11,473,373 B2
APPLICATION NO. : 16/469287
DATED : October 18, 2022
INVENTOR(S) : Mencaglia et al.

It is certified that error appears in the above-identified patent and that said Letters Patent is hereby corrected as shown below:

In the Specification

In Column 3, Line 66, delete "10%/a." and insert -- 10%. --, therefor.

In Column 8, Line 24, delete "13," and insert -- 1, --, therefor.

In Column 11, Line 30, delete "100/%" and insert -- -10% --, therefor.

In Column 11, Line 67, delete "A x," and insert -- Ax, --, therefor.

In Column 13, Line 3, delete "-30" and insert -- -3° --, therefor.

Signed and Sealed this
Twelfth Day of November, 2024

*Katherine Kelly Vidal*

Katherine Kelly Vidal
*Director of the United States Patent and Trademark Office*